United States Patent Office 3,275,516
Patented Sept. 27, 1966

3,275,516
PITUITARY GLAND EXTRACT AND PROCESS
FOR ITS MANUFACTURE
Samuel H. Eppstein, Charleston Township, Kalamazoo County, Mich., assignor to The Upjohn Company, Kalamazoo, Mich., a corporation of Delaware
No Drawing. Filed Apr. 27, 1964, Ser. No. 362,938
2 Claims. (Cl. 167—74)

This invention relates to a product of glandular origin and a process for its preparation, more particularly a novel biologically active protein product from porcine pituitary glands and a process of obtaining such novel product.

It is known that pituitary glands are a source of various biologically active products of complex composition, such as polypeptides and proteins. These products from pituitary glands are known to exert widespread biological effects, for example, on skeletal development, growth and metabolism; on gonadal development and behavior; on thyroid development and function; on growth and secretory activity of crop glands and mammary glands; and on functions of the adrenal cortex. Notwithstanding prior art attempts, for example, the chloroform-based process for pigeon crop sac principle, Schwenk et al., J. Biol. Chem., 147: 535–540 (1943), the isolation and characterization of such complex substances with varying biological activity continue to present profound challenges to chemists and biologists working in this area.

It is in the recited area of complex biologically-active factors of the pituitary gland that the present invention provides from porcine pituitaries a novel protein principle of substantially homogeneous character with marked biological activity as measured in pigeon crop sac assays. Additionally, the present invention provides an improved process of obtaining such novel product from porcine pituitary glands.

The starting material utilized in the process of obtaining the novel biologically active protein is a neutral aqueous solution, about pH 7.0, containing porcine pituitary gland crop sac factor as determined by assays using crop sacs of pigeons. To this starting material an approximately equal volume of a lower alkanol containing 1 to 3 carbon atoms, inclusive, is added, e.g., methanol, ethanol, propanol and isopropanol, preferably a denatured lower alkanol, especially denatured ethanol, preferably at below about 70° C. An insoluble precipitate is separated, preferably by centrifuging, and slurried with a minimum amount of water. The slurry is dialyzed at from about 0° to about 20° C. against purified water U.S.P. to remove inorganic material and alkanol. The dialyzed material is adjusted as to pH, preferably within the range 9 to 9.5, and dried to a powder at a temperature below about 30° C., preferably by drying from the frozen state.

The so-prepared powder is dissolved in water at pH of about 9 to 9.5 with the addition of a small amount of sodium hydroxide and the solution is applied to a column of cross-linked dextran gel previously equilibrated with 0.1 M sodium bicarbonate solution preferably containing q.s. butanol to 2% by volume as an antimicrobial agent. The cross-linked dextran gel is available as Sephadex from Pharmacia Fine Chemicals, Inc., Rochester, Minnesota, U.S.A. The varieties known as Sephadex G–75 and G–100 are operable. They have respective water regain values of about 7.5 gm. and about 10 gm. per gm. of dry weight. (Per Flodin, "Dextran Gels and Their Applications," Meijels Bokindustri, Halmstad, Sweden, 1962.) The column is eluted with additional bicarbonate or bicarbonate-butanol solution and fractions of eluate are collected. The protein content of the collected fractions is determined by one of the methods common to the art, most conveniently by optical density measurements at 280 m$\mu$. Plots of such measurements demonstrate that essentially two major peaks of protein content occur in collected sequential fractions of eluate, a first or faster peak and a second or slower peak. Fractions of eluate corresponding to the slower peak are combined and salts are removed therefrom by dialysis against purified water U.S.P. or by applying a concentrate of the combined fractions to a column of Sephadex G–25 (water regain value 2.5 gm. per gm.) equlibrated with 0.01 N NH$_4$OH and eluting the column with 0.01 N NH$_4$OH. Salt-free dialyzed material and eluates are obtained. The dialyzed material or eluate, respectively, is concentrated to dryness by freeze-drying or by drying in vacuo at a temperature below about 30° C. A dry powder is obtained.

The dry powder from the aforesaid slower peak is processed further by chromatography to obtain the novel, essentially homogeneous protein of high activity. An aqueous buffer, hereinafter designated tris buffer, is made up by dissolving 0.1 mole of HCl in 500 ml. H$_2$O, adjusting to pH 8.2 with 2 M aqueous solution of tris (hydroxymethyl)aminomethane and diluting with water to 1000 ml. A solution of the powder of the slower peak is prepared in this aqueous buffer of ionic strength 0.1 and pH 8.2. The buffer solution of the powder is applied to a column of diethylaminoethylcellulose. Diethylaminoethylcellulose means diethylaminoethylcellulose (capacity about 0.9 milliequivalent per gm.), or an equivalent such as a cross-linked dextran gel containing diethylaminoethyl groups (Sephadex A–50, capacity about 2.8 milliequivalents per gm., Pharmacia Fine Chemicals, Inc.). The charged column is subjected to continuous linear gradient elution to establish a gradient to ionic strength 0.5 utilizing the tris buffer solution of pH 8.2 plus added NaCl as required. The progress of the elution is followed in fractions of eluate by optical density determinations at 280 m$\mu$ and assays in crop sacs of pigeons. The active fractional eluates are combined and the protein component thereof is recovered by dialyzing the combined eluates to remove salts and volatile material, followed by freeze-drying to yield a dry powder.

Rechromatography of an aqueous solution of this freeze-dried powder over diethylaminoethylcellulose shows a single highly symmetrical peak indicating substantial homogeneity of the dry powder protein. The novel protein obtained in accordance with the present invention is useful for the maintenance of lactation in rabbits and rats, for breeding purposes and to increase broodiness in hens. The novel protein has been characterized by physical-chemical methods. Sulfur content is 2.39%; nitrogen content is 17.75%, corrected for ash and moisture. (The nitrogen content calculated on the basis of the amino acid found but less the amide nitrogen is 17%.) The isoionic point as determined by electrodialysis in the cold is 4.95. The isoelectric point as determined by free boundary electrophoresis is 5. The molecular weight $M_w$ is 25,000. The specific rotation is —23°. The N-terminal amino acid is alanine. The numbers of amino acid residues calculated on the basis of a 25,000 molecular weight are as follows: lysine, 10; histidine, 10; arginine, 14; aspartic acid, 22; threonine, 6; serine, 17; glutamic acid, 30; proline, 11; glycine, 16; alanine, 15; valine, 9; methionine, 4; isoleucine, 12; leucine, 24; tyrosine, 7; phenylalanine, 7; ½ cystine, 14; and tryptophane, 3.

The neutral aqueous solution starting material can be obtained from fresh porcine pituitaries, acetone desiccated porcine pituitaries, and porcine pituitaries dried from the frozen state by extraction thereof with acidified water, glacial acetic acid, 40% acetic acid in methanol or like solvent. Other biologically active materials in the extracts, for example, adrenocorticotrophic hormone, are removed by absorption thereof onto oxycellulose powder, for example, from dilute acetic acid solution. Thereafter the dilute acetic acid solution is adjusted to pH about 7.0 with sodium hydroxide, and any insoluble material is filtered or centrifuged off to provide the neutral aqueous solution starting material.

A neutral aqueous solution containing crop sac active substance is conveniently prepared from frozen hog pituitaries as follows: 11.3 kilograms of frozen hog pituitaries are desiccated in approximately 82 liters of acetone, and the insoluble solids are recovered by filtration. The insoluble material is dried in vacuo, preferably below about 30° C. 1800 grams of dry powder are obtained.

The powder is suspended in 16.2 liters of methanol and gently refluxed. Thereafter 10.8 liters of glacial acetic acid is added and the refluxing continued for approximately 2 hours. The refluxed mixture is cooled to ambient temperature, and the solid material is separated by filtration. The separated solid material is washed with 13.5 liters of 40% acetic acid, filtered and rewashed with 4.5 liters of 40% acetic acid. The filtrates and washings are combined. To the combined mixture, 47.5 liters of anhydrous ether is added with adequate mixing. After settling, preferably for approximately 16 hours at 5° C., the mixture is filtered, the solids are washed at a filter with four 1-liter portions of ether and dried in vacuo, preferably at below about 30° C. 180 grams of defatted, dehydrated material is obtained.

Sufficient glands are processed in the above manner to yield about 400 grams of defatted, dehydrated substance, which is taken up in 8 liters of 0.1 N acetic acid. This solution is clarified through a coarse sintered glass filter and the residue washed at the filter with 2 liters of 0.1 N acetic acid. To the combined washings and filtrate oxycellulose is added to remove other biologically active materials, for example, adrenocorticotrophin. The oxycellulose is removed and approximately 6.2 liters of spent liquor are obtained. This spent liquor is adjusted to pH about 7 by the addition of approximately normal sodium hydroxide. Any insoluble material is removed at the centrifuge or by filtration, preferably with the aid of a diatomaceous earth to provide a clarified solution. The so-clarified neutral aqueous solution provides starting material for the inventive process.

*Example*

12.5 liters of aqueous solution of pH about 7.0 obtained from porcine pituitaries as above-stated was chilled to about 4° C. and an equal volume of denatured alcohol at about 4° C. was added. After adequate mixing the whole was allowed to stand for about 16 hours at 4° C. The clear supernatant was separated by decantation, and the insoluble solids were recovered at the centrifuge. The recovered solids were dialyzed against deionized water at about 4° C. The dialyzed material was diluted to 4 liters with water and the whole was freeze-dried to yield 8 grams of dry powder.

One gram of such dry powder was dissolved in 25 ml. of deionized water with q.s. N NaOH to pH 10.6 and the solution was adjusted to pH 9.5 with N HCl. The hazy solution was clarified by centrifugation and applied to a column of cross-linked dextran gel (Sephadex G-75, water again value 7.5 gm. per gm.) 2 in. x 46 in., previously equilibrated with 0.1 M sodium bicarbonate containing % butanol. When all of the solution had entered the column, more of the same bicarbonate-butanol solution was allowed to flow through the column by gravity. The flow rate was 2 ml./min. Ten ml. fractions of eluate were collected in test tubes. The fractions were examined for absorbance in a spectrophotometer at a wave length of 80 m$\mu$. The collected fractions of tubes 51–71, tubes 72–105, and tubes 106–200, respectively, were combined, dialyzed at 4° C. and freeze-dried. Yields were 251 mg.; 411 mg.; and 38 mg., respectively.

232 mg. of the above 411 mg. was dissolved in 15 ml. of tris buffer (pH 8.2, $\mu$=0.1). The solution was applied to a column of diethylaminomethylcellulose, 1 in. x 29 in., previously equilibrated with the tris buffer. The solution was washed onto the column with 15 ml. of buffer and then about 100 ml. of the buffer was added to the column. Fractional eluates of about 9 ml. were collected automatically in test tubes at a flow rate of 2 ml. per minute. A linear gradient between ionic strengths of 0.1 and 0.5 was set up using 200 ml. volumes of tris buffer of pH 8.2 and these two ionic strengths. The linear gradient was changed from $0.5\mu$ to $1.0\mu$ by using 200 ml. volumes of pH 8.2 buffer of these two ionic strengths. Finally a gradient between $1\mu$ and $2\mu$ was established using 100 ml. volumes of buffer of these two ionic strengths. The early fractional eluates totaling about 160 ml. contained no protein and were discarded. The subsequent eluates were combined as 3 fractions, which were dialyzed against water and freeze-dried:

Fr. 1 (tubes 19–42) = 20.4 mg.
Fr. 2 (tubes 43–62) = 152 mg.
Fr. 3 (tubes 63–90) = 17.4 mg.

Prolactin assays by minimal dose giving response in the local crop sac assay of W. R. Lyons, Cold Spring Harbor Symposia, Quant. Biol., 5, 198 (1937), were as follows:

| Fr. | Total Dose, gamma | Response | Average Response |
| --- | --- | --- | --- |
| 1 | 4 | +, +, +, 0 | 0.75 |
| 2 | 2 | 1, 1, 1, 1, 1, 1 | 1.0 |
| 3 | 4 | 1, 1, 2, 0 | 1.0 |

139 mg. of a fraction 2 from diethylaminoethylcellulose chromatography was rechromatographed over a regenerated diethylaminoethylcellulose column in a manner analagous to that in the example. At tube 5 a gradient between 250 ml. volumes of tris buffers, pH 8.2 and ionic strengths of 0.1 and 0.5, respectively, was established. At tube 58 a gradient between ionic strengths 0.5 and 1.0 was established (150 ml. of each). The column was flushed with 2 M buffer at tube 87. A single highly symmetrical peak, indicating homogeneity, was obtained. Dry weight recovered was 117 mg.

Representative dry powders obtained by such rechromatography were blended and assayed by the Lyons technique.

| Total Dose, gamma | Response | Average Response |
| --- | --- | --- |
| Blend, 4 | 2, 2, 2, 2 | 2 |
| Blend, 1 | 1, 1, 1, 1, 1, 1, 2, 2 | 1.3 |
| Blend, 0.5 | 1, 1, 1, 1, 1, 1, 1, 1 | 1 |
| Standard [1], 1 | 1, 1, 2, 3 | 1.8 |
| Standard [1], 0.5 | 1, 1, 1, 1, 1, 2 | 1.1 |

[1] 30 I.U. per mg.

I claim:
1. A manufacture from porcine pituitary gland, a protein characterized by:
   (1) an N-terminal amino acid, alanine,
   (2) an isoionic point of 4.95,
   (3) an isoelectric point of 5,
   (4) a $M_w$ molecular weight of 25,000,
   (5) a specific rotation of −23°,
   (6) a sulfur content of 2.39%,
   (7) a nitrogen content of 17.75% by weight, calculated on an ash-free, moisture-free basis,
   (8) amino acid residues, per unit molecular weight of about 25,000 of lysine, 10; histidine, 10; arginine, 14; aspartic acid, 22; threonine, 6; serine, 17; glutamic acid, 30; proline, 11; glycine, 16; alanine, 15; valine,

9; methionine, 4; isoleucine, 12; leucine, 24; tyrosine, 7; phenylalanine, 7; ½ cystine, 14; and tryptophane; 3; and (9) a biological activity of about 30 International Units of pigeon crop sac activity per mg.

2. A process of preparing a manufacture from porcine pituitary glands comprising:
(1) mixing about equal volumes of a lower alkanol containing 1 to 3 carbon atoms, inclusive, and an aqueous solution of porcine pituitary gland crop sac principle at a pH of about 7 and a temperature below about 7° to precipitate said principle,
(2) dialyzing said precipitated principle against water at a temperature of from about 0° to about 20° C.,
(3) drying the dialyzed principle at a temperature below about 30° C.,
(4) preparing an aqueous solution of the dry principle and applying said solution to a column of cross-linked dextran gel having a water regain value of from about 7.5 to about 10 gms. per gm. of dry weight,
(5) eluting the column with an aqueous sodium bicarbonate solution, combining fractional eluates having pigeon crop sac activity and absorption of ultraviolet light of wave length about 280 m$\mu$, removing salts therefrom, and concentrating the salt-free eluates to a dry powder,
(6) preparing a solution of the dry powder in an aqueous tris (hydroxymethyl)aminomethane buffer of ionic strength 0.1 and pH 8.2 and applying said solution to a column of diethylaminoethylcellulose,
(7) eluting the column with tris(hydroxymethyl)aminomethane buffer of pH 8.2 to establish a continuous linear gradient to ionic strength 0.5 and collecting fractional eluates therefrom,
(8) combining fractional eluates having pigeon crop sac activity and absorption of ultraviolet light of wave length about 280 m$\mu$, removing salts and volatile material therefrom, and freeze-drying the salt-free eluates.

No references cited.

JULIAN S. LEVITT, *Primary Examiner.*

LEROY B. RANDALL, *Assistant Examiner.*